W. L. HOWARD.
VEHICLE WHEEL.
APPLICATION FILED MAR. 3, 1909.
929,437.
Patented July 27, 1909.
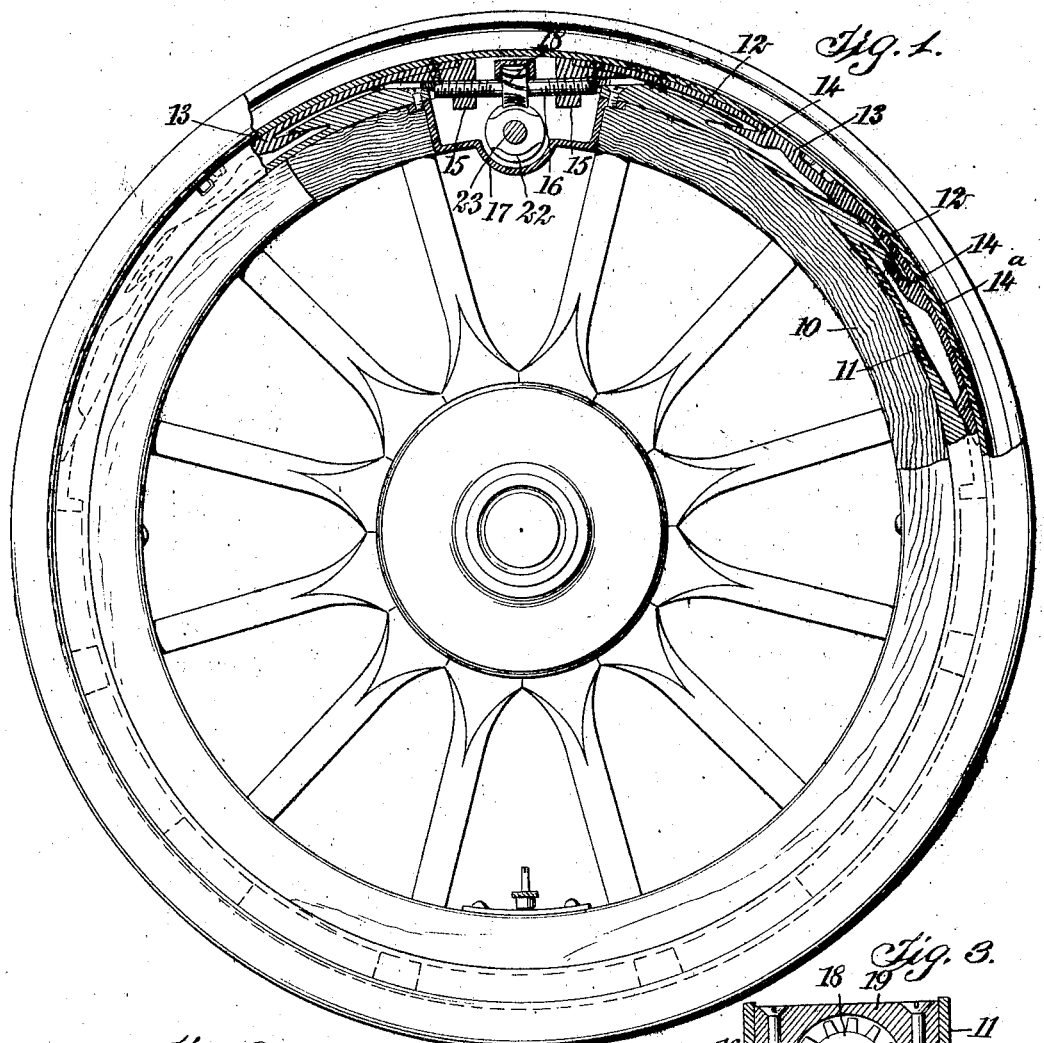
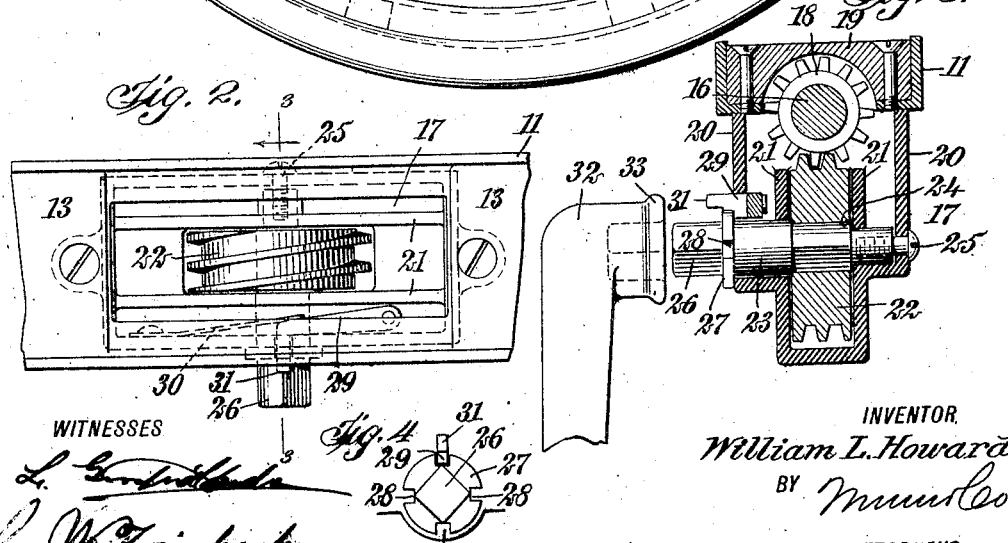
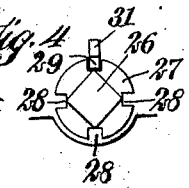
WITNESSES
INVENTOR.
William L. Howard
BY
ATTORNEYS

UNITED STATES PATENT OFFICE.

WILLIAM LEWIS HOWARD, OF TRENTON, NEW JERSEY.

VEHICLE-WHEEL.

No. 929,437.     Specification of Letters Patent.     Patented July 27, 1909.

Application filed March 3, 1909. Serial No. 481,132.

*To all whom it may concern:*

Be it known that I, WILLIAM L. HOWARD, a citizen of the United States, and a resident of Trenton, in the county of Mercer and State of New Jersey, have invented a new and Improved Vehicle-Wheel, of which the following is a full, clear, and exact description.

In my prior application, Serial Number 471,037, filed January 7, 1909, I disclose certain mechanism for detachably securing tire-carrying rims to vehicle wheels, the particular mechanism illustrated including curved sections movable circumferentially away from each other and radially to grip the rim. The mechanism for spreading apart the gripping sections includes a worm wheel carried by a rotatable rod, the opposite ends of which are provided with threads of opposite pitch.

In my present invention, I utilize substantially the same general features but provide an improved mechanism for spreading apart the gripping sections and for locking them in position.

Reference is to be had to the accompanying drawings, forming a part of this specification, in which similar characters of reference indicate corresponding parts in all the figures, and in which—

Figure 1 is a side elevation of a wheel constructed in accordance with my invention, a portion thereof being shown in section; Fig. 2 is an edge view of a portion of the wheel, the rim and gripping sections thereof being removed; Fig. 3 is a section on the line 3—3 of Fig. 2; and Fig. 4 is a detail showing the worm locking mechanism.

In the specific form of wheel illustrated, I employ a felly 10 of wood or other suitable material, and secured to the periphery of the felly is a band 11 having outwardly-extending annular side flanges and a plurality of outwardly-extending lugs or projections 12, intermediate said flanges and each having cam surfaces. Between the opposite sides of the channels are two gripping members 13, 13, moving circumferentially and having inwardly-extending projections 14, which engage with the projections 12 to move the gripping members radially at the same time they are moved circumferentially. The outer surfaces of the gripping members engage with the inner surface of the ordinary tire-carrying rim 14ª.

At the adjacent ends of the gripping members, each is provided with a block or bracket 15 having a threaded aperture therethrough, and intermediate of the two blocks or brackets and extending through the two threaded apertures is a threaded rod 16. The opposite ends of the rod are reversely threaded, so that by rotating the rod, the two blocks and their gripping members may be drawn toward or forced away from each other. The felly 10 is cut away to receive the two blocks 15 and a casing 17 fills the aperture within the felly. The blocks are disposed within the casing, as is also the entire operating mechanism therefor. Intermediate of the ends of the rod 16 is a worm wheel 18, held against longitudinal movement by a transversely-extending block 19 secured in place within the channel-shaped band 11 and engaging with opposite sides of the worm wheel. The casing 17 is provided with oppositely-disposed side walls 20 and between these side walls and parallel thereto are parallel partition walls 21. Between the two partition walls 21 is a worm 22 intermeshing with the worm wheel 18 and secured to a pivot or shaft 23. The worm wheel is non-rotatable in respect to the shaft and the shaft is journaled in the partitions 21, so as to hold the worm in place yet permit of its rotation by the rotation of the shaft. The shaft 21 is held against longitudinal movement in one direction by the engagement of a shoulder 24 with one of the partitions 21, and is held against longitudinal movement in the opposite direction by a screw 25 extending through one of the outer walls 20 of the casing and into the end of the shaft. The opposite end of the shaft extends through the other wall 20 and its outer end 26 is non-circular in cross section, as is illustrated particularly in Fig. 4. The shaft end 26 adjacent the outer surface of the adjacent wall 20, carries a collar 27 provided with a series of notches 28 in the periphery thereof.

Within the casing and intermediate of the casing wall 20 and the partition wall 21, is a pivoted dog 29 having the end thereof extending out through an aperture in the wall 20 and into one of the notches 28 in the collar 27. The dog is normally pressed outwardly by a spring 30, but may be forced inwardly out of engagement with the collar 27 to permit the rotation of the latter and the worm. The dog carries an outwardly-extending lug 31 beyond the periphery of the collar 27, and this lug is of such size that when the dog is pressed inwardly to bring the outer end of the lug into the plane of the outer surface of the collar 27, said dog will be out of operative engagement with the notches of the collar and the shaft may be freely rotated.

For rotating the shaft I employ a tool 32 having a recess in the face thereof to receive the non-circular end 26 of the shaft and having a flange 33 for engagement with the lug 31 to force the latter inwardly to the plane of the outer surface of the flange or collar 27. When it is desired to remove a rim from the wheel, it is merely necessary to place the tool over the end 26 and force it to the limiting position. This will automatically unlock the flange 27 and permit the shaft to be rotated. The tool may now be turned to operate the worm and worm wheel to draw the gripping sections 13, 13 toward each other, and the rim may now be removed, as set forth more fully in my prior application above referred to. The instant the tool is removed the spring 30 will force the dog 29 out into operative engagement with the flange 27, so that a rotation of only a fraction of a revolution will permit the dog to enter some one of the notches and lock the worm and worm wheel against further movement. This locking mechanism positively prevents the worm or worm wheel from being rotated or the gripping sections from being loosened due to the jarring or shaking of the wheel while in service.

Having thus described my invention, I claim as new and desire to secure by Letters Patent:

1. A vehicle wheel having a detachable rim, a gripping section for engagement therewith, mechanism for moving said gripping member and including a rotatable member, a notched flange carried by the latter, and a spring-pressed dog in engagement with said notched flange and automatically movable to inoperative position upon the application of a tool to said rotatable member.

2. A vehicle wheel having a detachable rim, two curved gripping members radially and circumferentially movable, a rotatable worm wheel for moving said members toward or away from each other, a casing, a worm within said casing and in engagement with said worm wheel, a shaft disposed within said casing and carrying said worm and terminating outside of said shaft, a notched flange carried by said shaft, and a spring-pressed dog within said casing and having operative engagement with said flange and automatically movable to inoperative position upon the application of a tool to the outer end of the shaft to rotate the latter.

3. A vehicle wheel having a felly provided with an aperture therein, a casing within said aperture, a removable rim, a movable gripping member intermediate of said felly and said rim and terminating adjacent said casing, a rotatable member having engagement with said member for moving it longitudinally, a worm within said casing and rotating said member, a shaft extending into said casing and supporting said worm, partition walls within said casing and holding said worm against longitudinal movement, a notched flange carried by said shaft, and a spring-pressed dog within said casing, intermediate of one of said partition walls and the side wall of the casing, and extending into operative engagement with said notched flange and having a lug extending beyond said notched flange, whereby said dog may be automatically moved out of engagement with said notched flange upon the application of a tool to the outer end of said shaft.

In testimony whereof I have signed my name to this specification in the presence of two subscribing witnesses.

WILLIAM LEWIS HOWARD.

Witnesses:
THOMAS DALZELL,
WILLIAM H. RODDY.